United States Patent
Soejima (10) Patent No.: US 7,336,979 B2
(45) Date of Patent: Feb. 26, 2008

(54) MULTIFUNCTION PERSONAL COMPUTER/MOBILE PHONE

(75) Inventor: Yukiyoshi Soejima, Tokyo (JP)

(73) Assignee: UME Insurance Inc., Newark, DE (US)

( * ) Notice: Subject to any disclaimer, the term of this patent is extended or adjusted under 35 U.S.C. 154(b) by 583 days.

(21) Appl. No.: 10/900,088

(22) Filed: Jul. 27, 2004

(65) Prior Publication Data

US 2005/0026658 A1    Feb. 3, 2005

(30) Foreign Application Priority Data

Jul. 29, 2003    (JP)    ............... 2003-282086

(51) Int. Cl.
  *H04B 1/38*    (2006.01)
  *H04M 1/00*    (2006.01)
(52) U.S. Cl. ............... 455/575.1; 455/90.3; 455/550.1; 455/553.1; 455/556.1; 455/556.2; 455/575.2; 455/575.3; 455/575.4
(58) Field of Classification Search ............... 455/90.3, 455/550.1, 553.1, 556.1, 556.2, 575.2, 575.3, 455/575.4, 575.1
See application file for complete search history.

(56) References Cited

U.S. PATENT DOCUMENTS

| | | | |
|---|---|---|---|
| 6,748,248 B1 * | 6/2004 | Pan et al. ................. | 455/575.1 |
| 6,983,175 B2 * | 1/2006 | Kwon ....................... | 455/575.1 |
| 7,003,266 B2 * | 2/2006 | Bestle ....................... | 455/90.3 |
| 7,098,813 B1 * | 8/2006 | Hung et al. ................ | 341/22 |
| 7,130,669 B2 * | 10/2006 | Moon ........................ | 455/575.3 |
| 7,200,426 B2 * | 4/2007 | Kawamura ................. | 455/575.4 |
| 7,206,616 B2 * | 4/2007 | Choi .......................... | 455/575.1 |
| 2003/0003878 A1 * | 1/2003 | Bestle ......................... | 455/90 |
| 2004/0185922 A1 * | 9/2004 | Sutton et al. ............ | 455/575.1 |
| 2005/0054393 A1 * | 3/2005 | Fagerstrom et al. ...... | 455/575.1 |

FOREIGN PATENT DOCUMENTS

| | | |
|---|---|---|
| JP | 2001-313705 | 11/2001 |
| JP | 2001-339499 | 12/2001 |

* cited by examiner

*Primary Examiner*—Lana Le
*Assistant Examiner*—Bobbak Safaipour
(74) *Attorney, Agent, or Firm*—Flynn, Thiel, Boutell & Tanis, P.C.

(57) ABSTRACT

The invention aims to provide a multifunction personal computer/mobile phone capable of being used both as a mobile phone and as a mobile personal computer, to improve input operability when used as a mobile phone as well as a personal computer, and to retain a compact form when it is not used.

A multifunction personal computer/mobile phone is so configured that a left keyboard, a display and a right keyboard are mounted on a hinge so that they are folded and unfolded freely, wherein on the left and right keyboards, key indications for digits, characters, symbols or the like for personal computer use are arranged, and on either of the keyboards, key indications for digits, characters, symbols or the like for mobile phone use are arranged so that the hinge is at the far end from a user, wherein the display is formed rotatably with respect to the keyboard, and the left and right keyboards are spread to a position where the surfaces of the keyboards are horizontal.

11 Claims, 6 Drawing Sheets

MULTIFUNCTION PERSONAL COMPUTER/MOBILE PHONE

BACKGROUND OF THE INVENTION

1. Field of the Invention

The present invention relates to a mobile phone capable of incorporating features of a personal computer.

2. Description of the Related Arts

A mobile phone that is not just a portable, compact and light telephone, but also functions as an information transmitter/receiver as well as a processor and a memory is now widely used. At the same time, a personal computer has a number of features such as a word-processor, a memory or the like as discussed above, and its downsizing or slimming down is under way. Since a mobile phone and a personal computer are comprised of similar electronic and electric means, it is contemplated to share the similar components mentioned above by connecting both by means of cables or the like or directly fitting them.

Since a mobile phone is required to be small and light, keys to be operated by fingers that constitute an input unit are inevitably tiny. Alternatively, although some mobile phones have a touch panel type of an input unit instead of the keys, the touch panel is also extremely small. Thus, operation of keys is very difficult. In particular, e-mail transmission from a mobile phone is more difficult, more time-consuming and more prone to typing errors than that from a personal computer.

On the other hand, in e-mail transmission from a mobile phone by utilizing a personal computer connected thereto, a user operates the keys of the personal computer, which offers better operability and is less prone to typing errors. This is a simple combination of a personal computer and a mobile phone, and requires a connection kit for linking a personal computer with a mobile phone. In addition, as any similar parts of each remain unshared, this combination offers poor portability.

(Reference: Japanese Patent Laid-open Application Nos. 2001-313705 and 2001-339499)

SUMMARY OF THE INVENTION

The invention provides a multifunction personal computer/mobile phone that shares features of a mobile phone and those of a personal computer, and has achieved a combination of a downsized/slimmed down mobile phone and an operable personal computer. When the mobile phone of the invention is used as a telephone, dial keys of digits, characters, symbols or the like are operated as ordinary keys, while when operations of keys for more characters and symbols, etc. are required like in e-mail transmission, as with, the keys of the invention that have same key arrangement as a personal computer keyboard are operated. Further, a relatively large display as a portable device and better operability are offered. Since the mobile phone of the invention is configured by integrating the features of a personal computer and a keyboard thereof into the mobile phone, while still retaining the features of a mobile phone, as described above, the invention implements the multifunction mobile phone having features of both a mobile phone and a personal computer.

The invention aims not only to improve input operability of a mobile phone when key-intensive operations are involved, but also to provide a multifunction personal computer/mobile phone that also utilize features of a personal computer.

More specifically, the invention aims to provide a mobile phone that is also used as a personal computer. When it is used as a telephone, use as an ordinary compact mobile phone is possible, while when it is used as a personal computer, it offers a keyboard each key of which has a sufficient size and thus provides a sufficient space for user's fingers although it is still portable.

The invention aims to meet the objectives mentioned above wherein when a mobile phone is used as a telephone, dial keys similar to conventional ones are used as operating keys, while when it is used for e-mail transmission or as a personal computer, keys for a personal computer are used as operating keys. In addition, the invention comprises a multifunction personal computer/mobile phone that has integrated features of a personal computer and is provided with a display that is used both for a mobile phone and a personal computer.

To be specific, the invention comprises a multifunction personal computer/mobile phone, wherein a keyboard on the left side, a display and a keyboard on the right side are mounted onto a hinge and so that they are freely folded and unfolded, wherein on keys of the left and right keyboards, digits, characters, symbols or the like for the personal computer are indicated, and on keys of either one of the keyboards, digits, characters, symbols or the like for a mobile phone are indicted so that the hinge will be in the far end position from a user, wherein the display is rotatably formed with respect to the keyboards, and the left and right keyboards are unfolded to a position where the surfaces of the keys of both keyboards are horizontal.

In addition, the multifunction personal computer/mobile phone is characterized by the display that is rotatably formed around the hinge.

Or, the multifunction personal computer/mobile phone is characterized by the display that is rotatably configured around a side end of the hinge of either of the right/left keyboard.

Or, the multifunction personal computer/mobile phone is characterized by the indications of the keys for digits, characters, symbols or the like for a mobile phone are larger than those for a personal computer.

A multifunction personal computer/mobile phone of the invention shares features of a mobile phone and a personal computer, is divided into three parts, and is folded threefold. When used as a telephone, it is manipulated similarly to an ordinary mobile phone because the arrangement of digits, characters, symbols, etc. on dial keys is similar to that of an ordinary mobile phone. In addition, when used for e-mail transmission which requires key-intensive operations, or when is used as a personal computer, the right and left keyboards that are folded on the front and back faces of the display sandwiched therebetween are unfolded and spread to 180°. This secures adequate space for the arrangement of the digits, characters, symbols, etc. on the keyboards and provides large keys, thus offering better operability of the keys. In addition, the display is rotatable to 90° with respect to the keyboards, so as to be positioned in the center and in face of a user.

To send or receive e-mail messages or the like using the mobile phone, a user no longer needs to press repeatedly a same key to select a character or a symbol, but obtains instead a particular character or a symbol by manipulating the keys on the keyboard for the personal computer.

DETAILED DESCRIPTION OF THE PREFERRED EMBODIMENTS

In the following, embodiments of the multifunction personal computer/mobile phone according to the invention are described with reference to the drawings.

Embodiment 1

Figure 1:
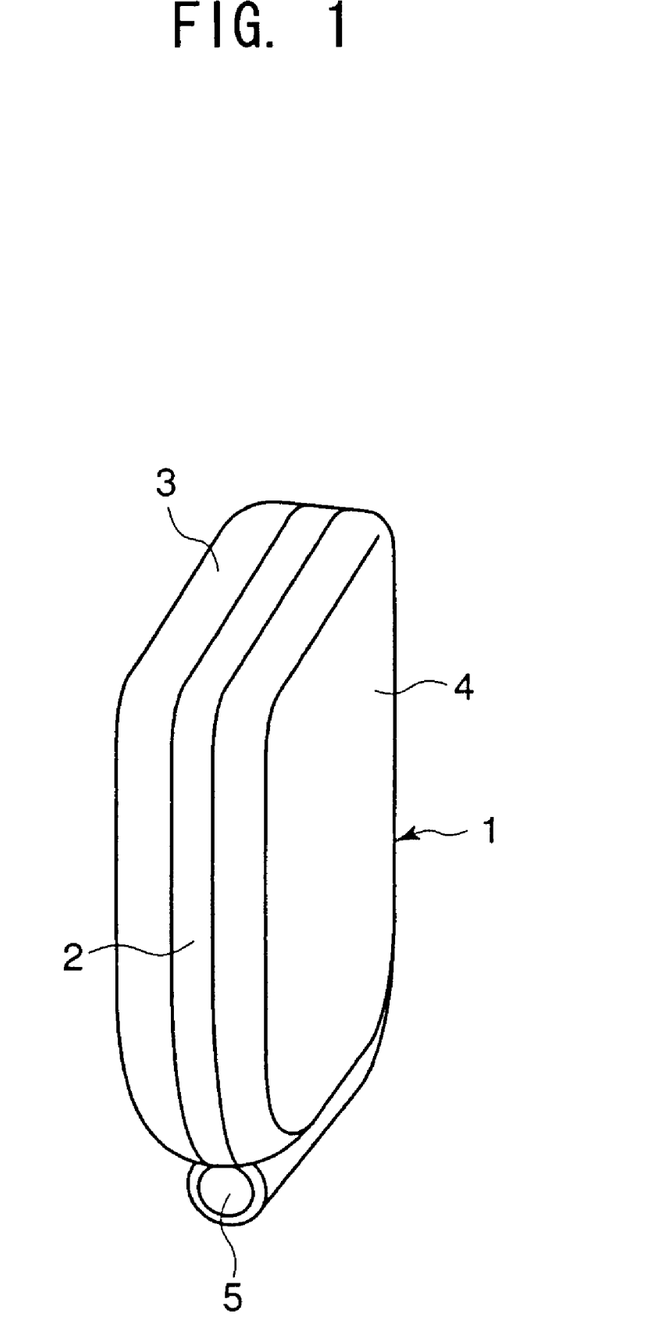
FIG. 1 is a perspective view of a multifunction personal computer/mobile phone according to the invention when it is folded.
Figure 2:
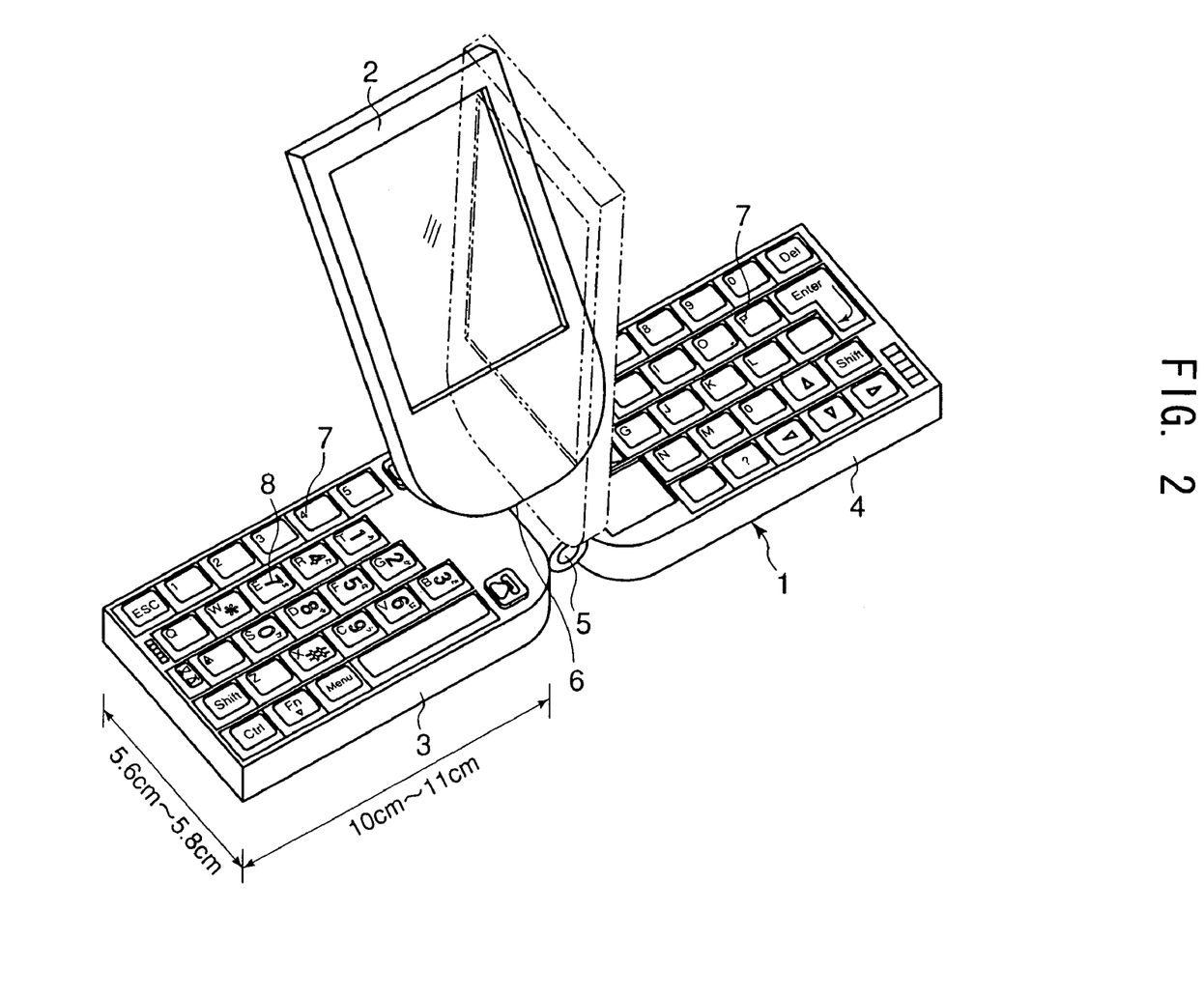
FIG. 2 is a perspective view of a multifunction personal computer/mobile phone according to the invention when it is unfolded and used as a personal computer.
Figure 3:
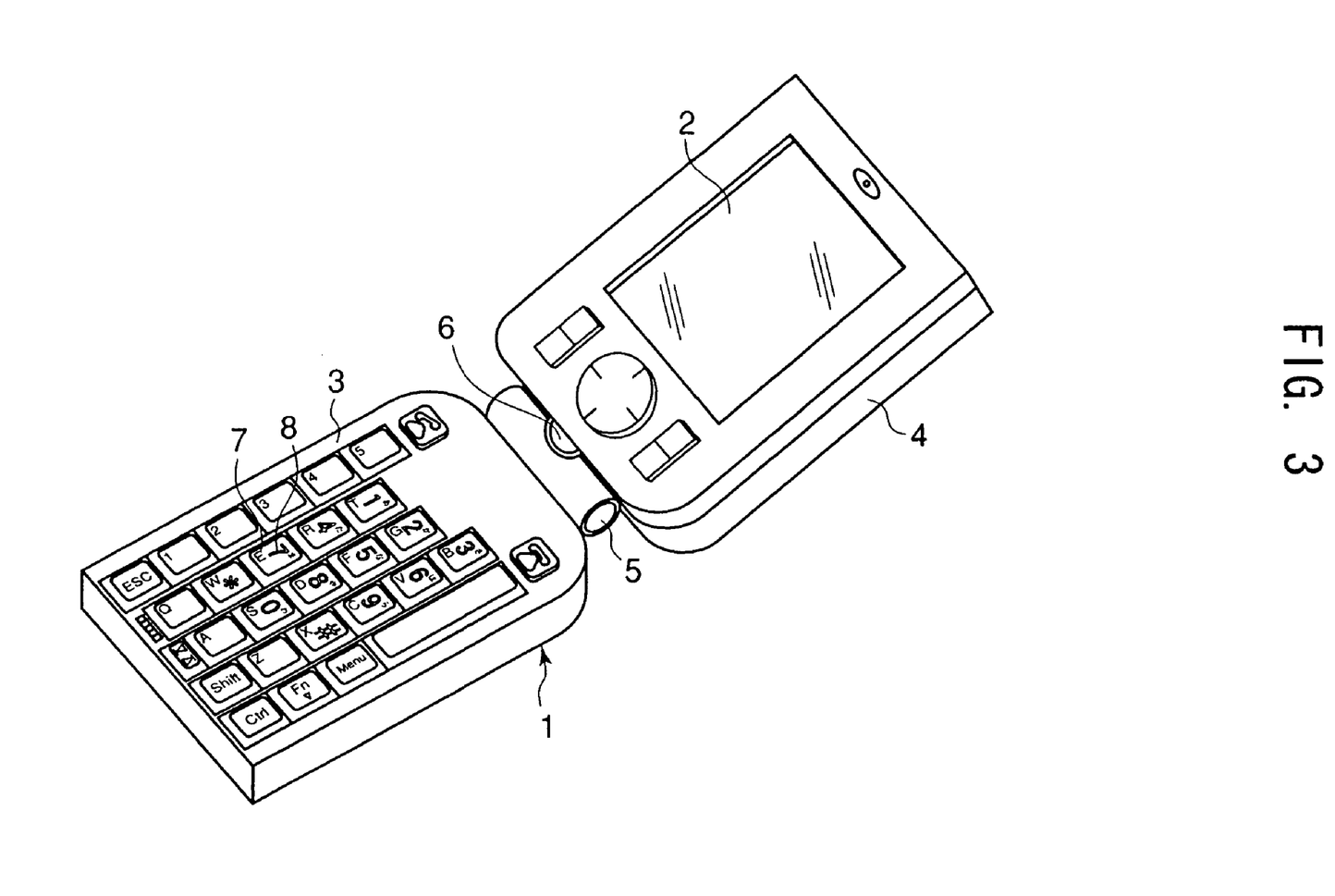
FIG. 3 is a perspective view of the multifunction personal computer/mobile phone according to the invention when it is used as a mobile phone with its one keyboard unfolded.

FIGS. 1 to 3 show an embodiment of a multifunction personal computer/mobile phone of the invention. A multifunction personal computer/mobile phone 1 has a structure in which it is divided into three parts that are folded around the axis. FIG. 1 is a perspective view of mobile phone in a folded position.

A display 2 is located at the center when folded, and a left keyboard 3 and a right keyboard 4 are positioned so as to cover the front and back faces of the display, respectively. The display 2 and left and right keyboards 3, 4 are pivotably connected to a hinge 5 that serves as an axis. FIG. 2 is a perspective view in which the left and right keyboards 3, 4 are unfolded. At the base edge of the display 2, a ball-shaped protrusion 6 is formed. The ball-shaped protrusion 6 is fit in the center of the hinge 5 so that it freely rotates to 90°. The display 2 is thus rotatable, and as illustrated in FIG. 2, it rotates from the position depicted in broken line to the position depicted in solid line. This makes the screen of the display 2 positioned in the center of the keyboards 3, 4 spread to the left and right and the display is thus in face of a user. The display rotates both clockwise and anti-clockwise.

The display 2 comprises the pivotable ball-shaped protrusion 6 so that it tilts back and forth to the surfaces of the left and right keyboards 3, 4 within the range of approximately 180°. In addition, the display 2 is formed so that at the tilt position, after it is rotated 90° and is in face of a user, it firmly stops at an appropriate position within the range of 180°. It is also possible to comprise the stopper function that stops the display at a predetermined position, for example, at around 130° that is considered optimum inclination when the display is viewed.

When folded, the left keyboard 3 is positioned to contact the display 2. However, when the device is used as either a mobile phone or a personal computer, the keyboard is pivoted on the hinge 5. On the surface of the left keyboard 3, keys 7 representing the indications of digits, characters, symbols or the like are arranged in the similar manner to the arrangement and structure of a JIS standard keyboard for a personal computer. The left keyboard 3 comprises the keys 7 to be typed by the left hand fingers.

Similarly, the right keyboard 4 is placed adjacent to the display 2 when folded. When the mobile phone is used as a personal computer, the keyboard is pivoted on the hinge 5. On the surface of the keys of right keyboard 4, indications of digits, characters, symbols or the like according to a JIS standard personal computer are provided, and the keys 7 have the similar arrangement and structure to those of conventional ones. The right keyboard 4 comprises the keys 7 to be typed by the right hand fingers.

FIG. 3 is a perspective view showing the device when it is used as a mobile phone. As shown in FIG. 3, only the left keyboard 3 is unfolded to the display 2 that is pivoted to an appropriate angle. While the right keyboard 4 remains folded adjacent to the display 2, the display is positioned in a predetermined angle to the keyboard 3. When pivoting, the display either freely stops at an appropriate position, as shown above, or is designed to stop at predetermined angles, for example, approximately at 130° or 170°.

The keys 7 on the left keyboard 3 not only constitute the keys 7 for a personal computer, as described above, but also functions as keys 8 for a mobile phone using other indications on the same surface of the keys. The key indications "1" and "the Japanese syllabary character あ" for the telephone use are assigned to the key "T" for PERSONAL COMPUTER, and the key indications "4" and "the Japanese syllabary character た" are assigned to the key "R". Similarly and principally, the key indications "7" and "the Japanese syllabary character ま" are assigned to the key "E", the symbol "*" is assigned to the key "W", the key indications "2" and "the Japanese syllabary character か" are assigned to the key "G", the key indications "5" and "the Japanese syllabary character な" are assigned to the key "F", the key indications "8" and "the Japanese syllabary character や" are assigned to the key "D", the key indications "0" and "the Japanese syllabary characters わ and ん" are assigned to the key "S", the key indications "3" and "the Japanese syllabary character さ" are assigned to the key "B", the key indications "6" and "the Japanese syllabary character は" are assigned to the key "V", the key indications "9" and "3" are assigned to the key "C", and "#" is assigned to the key "X". In addition, as indications of the keys 7 are for personal computer use, they are marked so that they can be read from longitudinal direction when the left and right keyboards 3, 4 are spread horizontally. On the other hand, indications of the keys 8 are marked so that they can be read from the end side position opposite to the hinge 5. The indications of the keys 7 and the indications of the keys 8 are thus placed at a right angle. In addition, as for the sizes of the indications, considering that the mobile phone is used more frequently as a telephone, large characters and symbols are indicated on the keys 8, thus offering user's convenience. Furthermore, when the keys 8 are viewed from the longitudinal direction, they do not hinder keystrokes because the indications of digits, characters, symbols or the like are so printed or indented as to be dim or invisible for a user at the longitudinal direction.

Figure 4:
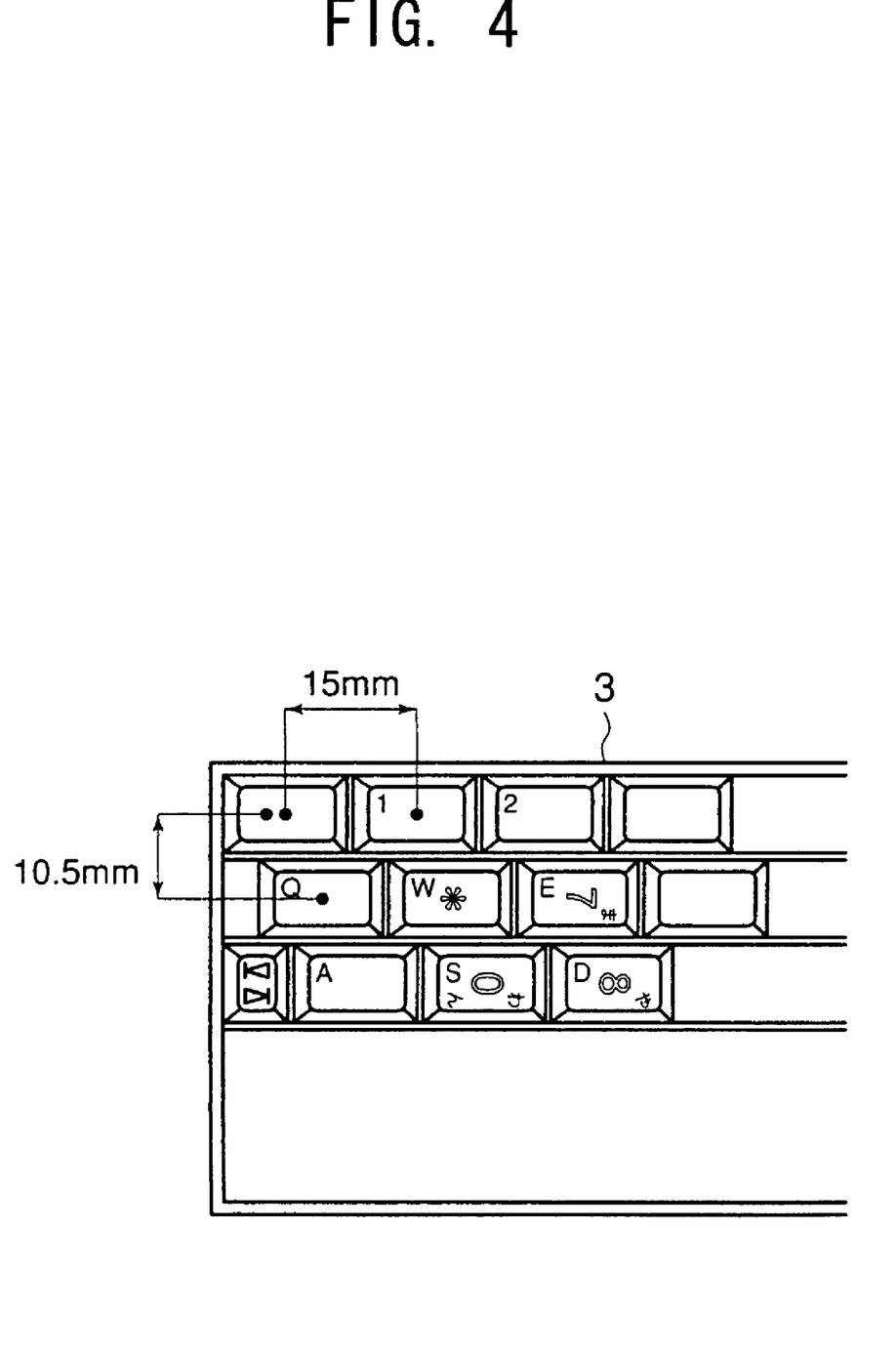

FIG. 4 shows a distance between each key of the keys 7 and the keys 8 according to the invention. The pitch between keys of an ordinary mobile phone is approximately 1.3 mm in length and approximately 7.5 mm in width, while the pitch of an ordinary personal computer is approximately 19 mm both in length and width. Considering the fact that a distance between fingers of an average adult ranges from about 14 to 21 mm, the size of the mobile phone 1 of the invention is made about 100 to 110 mm×56 to 58 mm when it is folded, which provides a pitch of about 15 mm as a distance of the keys 7 in length when the device is used as a personal computer. Similarly, the distance in width is about 10.5 mm. This reduces typing errors on adjacent keys.

FIG. 2, as described above, is a perspective view wherein the multifunction personal computer/mobile phone is used as a personal computer. As shown in FIG. 2, the left and right keyboards 3, 4 are spread to 180°, so that both are flat. The display 2 is pivoted 90° on the ball-shaped protrusion 6. In FIG. 2, the display 2 rotates from the position depicted in broken line to the position depicted in solid line. After rotation, it is then tilted to an angle which facilitates a good screen view. In this position, the display 2 is placed in the center of the left and right keyboards 3, 4, facing to a user, and the left and right keyboards 3, 4 are placed in proximal to a user. As described above, since each pitch between the keys 8 in length and width is adequately secured, the operation is less prone to errors in typing the adjacent keys 8, thus making the device user-friendly as a personal computer.

Embodiment 2

Figure 5:
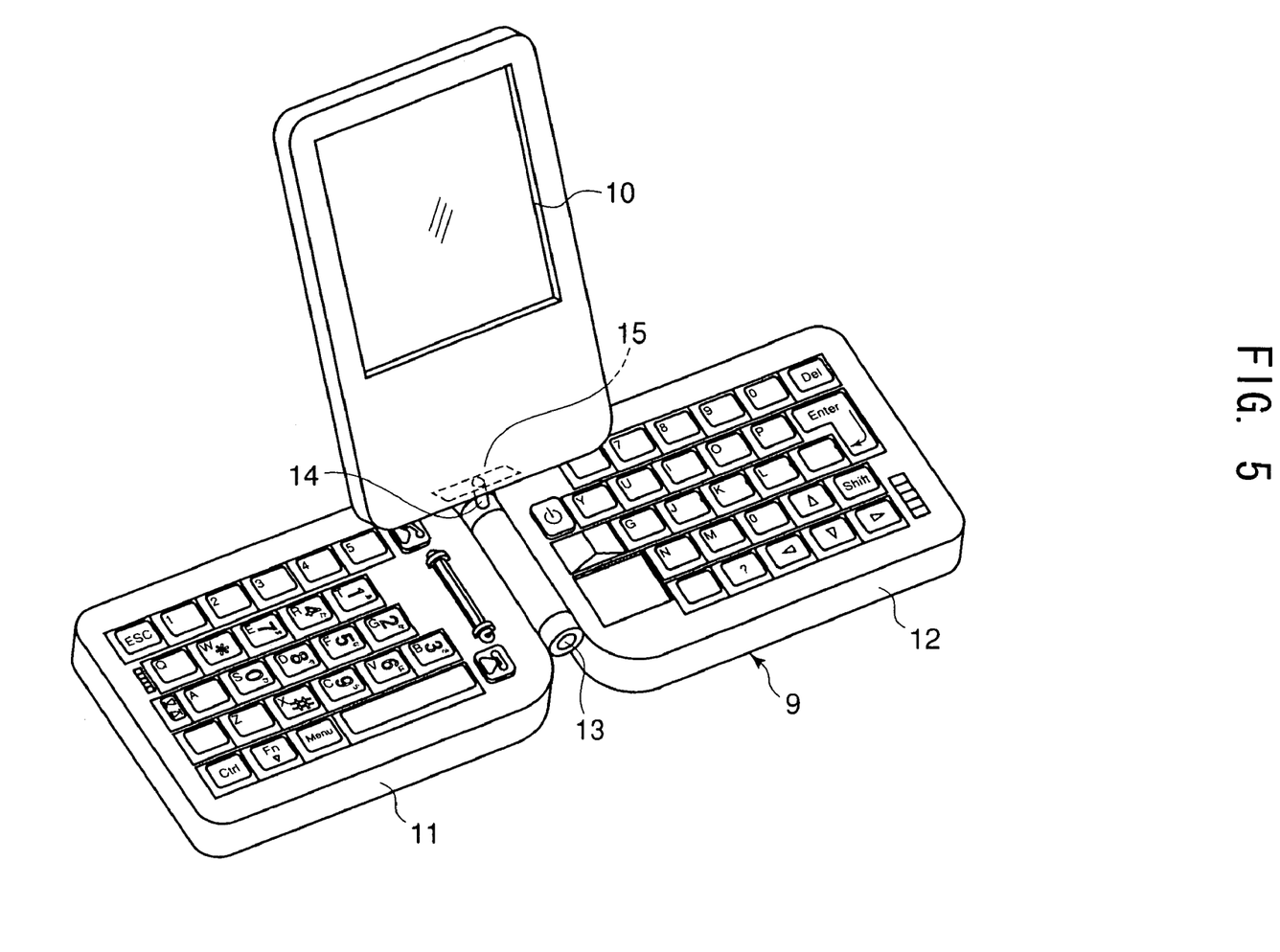
FIG. 5 is a perspective view of another embodiment of a multifunction personal computer/mobile phone according to the invention when used as a personal computer.

FIG. 5 is a perspective view of another embodiment of a multifunction personal computer/mobile phone. Similar to the embodiment 1 described above, the multifunction personal computer/mobile phone 9 comprises a display 10, a left keyboard 11 and right keyboard 12 each mounted on a hinge 13. When used as a personal computer, by pivoting and spreading the three parts, the display 10 is positioned in the center, and the left keyboard 11 and right keyboard 12 are positioned in the left and right, respectively. When used as a personal computer, the display 10 rotates 90° around an axis 14 which is located at the bottom edge of the display 10. The axis 14 is formed in a ball-shaped protrusion similar to embodiment 1, or a cylindrical projection.

In addition, positioning the other end of the axis 14 at the edge of the hinge 13 allows the rotated display 10 to stand at the back end of the left and right keyboards 11, 12, when used as a personal computer.

Although the display 10 is used in a position just by rotation, it is also moved horizontally by moving along a slot 15 formed in the bottom edge of the display 10. The arrangement of the indications of digits, characters, symbols or the like of the left and right keyboards 11, 12 or other various functions as a personal computer or a mobile phone are same as those of the embodiment 1.

Embodiment 3

Figure 6:
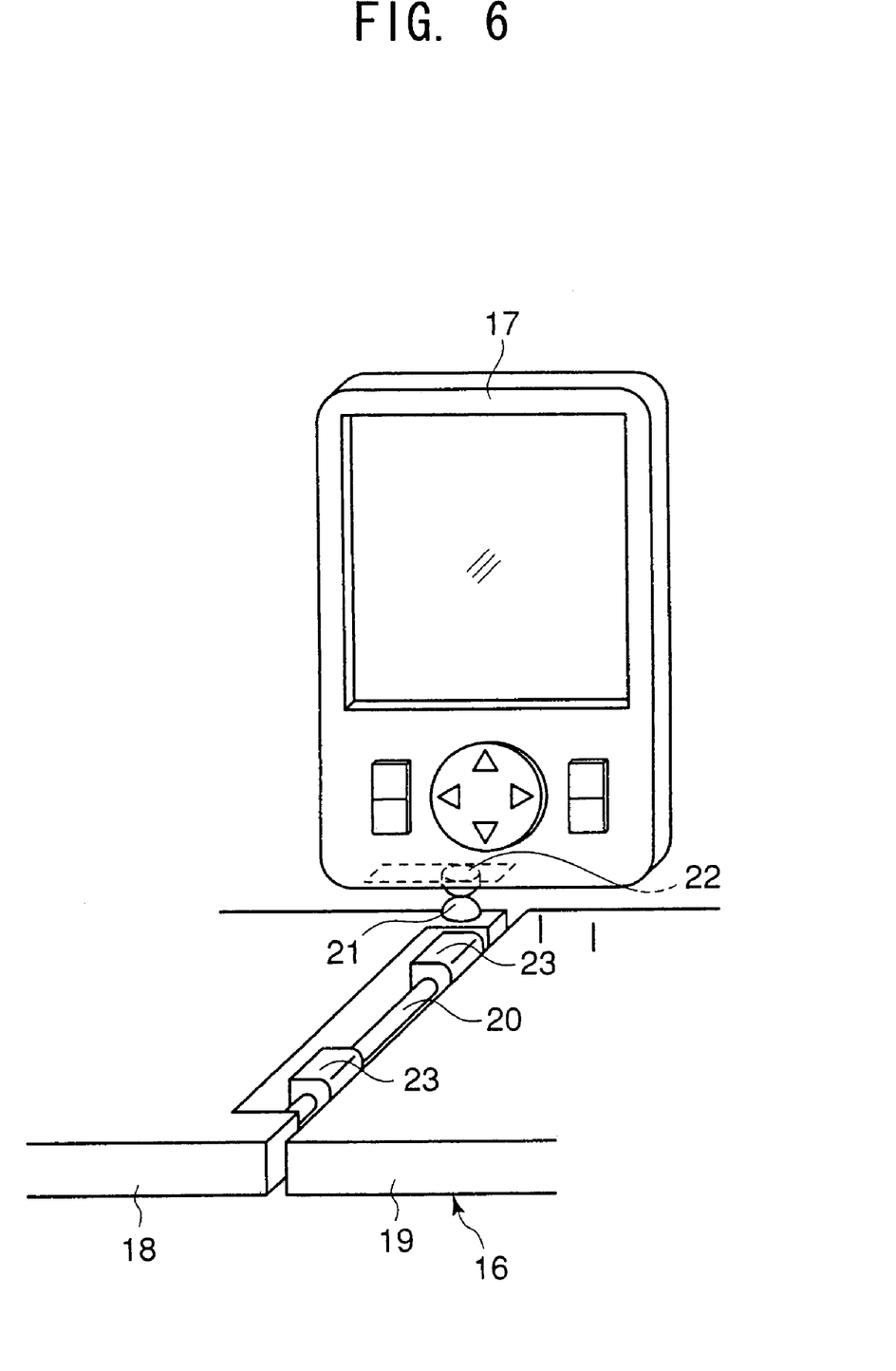
FIG. 6 is a perspective view showing an axis of another embodiment of a multifunction personal computer/mobile phone according to the invention.

FIG. 6 is a perspective view of a part of other embodiment of a multifunction personal computer/mobile phone. A multifunction personal computer/mobile phone 16 comprises a display 17 in the center, a left keyboard 18 and a right keyboard 19 which are folded on the front and back faces of the display sandwiched therebetween, and the keyboards 18, 19 are pivotably connected to a hinge 20.

The display 17 is rotatable around an axis 21 located either on the hinge 20 or at the edge proximal to the hinge 20 of either the left or the right keyboard 18, 19. One end of the axis 21 is movably fit into a sliding slot 22 at the bottom end of the display 17.

This configuration makes the display 17 pivotable like the left and right keyboards 18, 19, and rotatable 90° to face the keyboard 18, thus allowing the device to be used as a mobile phone. When used as a mobile phone, the right keyboard 19 is folded on the backside of the display 17.

In addition, when used as a personal computer, the display 17 slides along the slot 22 to the center position of the left and right keyboards 18, 19.

In order to fold the display 17 onto the left keyboard 18 and further the right keyboard 19 onto the display 17, at the bottom end of the display 17, a space corresponding to rising height of a rising gripper 23 fixed to the hinge 20 of the right keyboard 19 is provided, wherein the device is so structured that abutment of the display 17 and the gripper 23 does not prevent the display and the keyboards from being folded, and that the three parts are easily folded.

The arrangement of the indications of digits, characters, symbols or the like of the left and right keyboards 18, 19 and other various functions as a personal computer and a mobile phone are same as those of embodiments 1 and 2. In addition, when used as a mobile phone, the conditions are similar to those of FIG. 3, while the conditions when used as a personal computer are similar to those of FIG. 5.

In this embodiment, it is needless to say that the left and right keyboards and the display, etc. are mechanically connected as well as electrically.

BRIEF DESCRIPTION OF THE DRAWINGS

FIG. 4 is a partially enlarged plan view showing an arrangement and a size of indications of digits, characters, symbols or the like.

What is claimed is:

1. A multifunction personal computer/mobile phone includes three parts comprising a display having a back side and opposite viewing side, a left keyboard, a right keyboard and a hinge unit, wherein said display, said left keyboard and said right keyboard are mounted on said hinge unit so that said three parts are freely folded and unfolded, wherein on one of said left and right keyboards, indications of digits, characters, symbols or the like for personal computer use are arranged, wherein on the other one of said left and right keyboards, indications of digits, characters, symbols or the like for mobile phone use are arranged so that said hinge is at a far end position from a user, wherein said display is rotatable and pivotable with respect to said left and right keyboards, and said right and left keyboards are structured to be spread to a position where said indications of both said keyboards are horizontal, said display being rotated and pivoted between oppositely facing first and second orientations wherein said display is usable with said one of said left and right keyboards in said first orientation as a personal computer and being usable with said other of said left and right keyboards in said second orientation as a mobile phone.

2. A multifunction personal computer/mobile phone according to claim 1, wherein said display is rotatably supported by a hinge of said hinge unit.

3. A multifunction personal computer/mobile phone according to claim 1, wherein a display is rotatably configured at an edge of a hinge of either said left or right keyboard.

4. A multifunction personal computer/mobile phone according to claim 1, wherein indications of digits, characters, symbols or the like for mobile phone use are larger than indications for personal computer use.

5. A multifunction personal computer/mobile phone according to claim 1, wherein said first and second orientations face in opposite directions with said display in said first orientation having said viewing side facing toward said one of said left and right keyboards to function in combination therewith as a personal computer and said display in said second orientation having said viewing side facing oppositely toward said other of said left and right keyboards to function in combination therewith as a mobile phone.

6. A multifunction personal computer/mobile phone according to claim 1, wherein said display is disposed between said left and right keyboards wherein said viewing face faces in opposite directions when in said first and second orientations so that said viewing side faces either towards said left keyboard or towards said right keyboard to be usable therewith.

7. A multifunction personal computer/mobile phone according to claim 1, wherein said three parts may be unfolded from a storage configuration wherein said display and said left and right keyboards lie flat against each other in three layers to an unfolded use configuration wherein said left and right keyboards are spread open and said display is pivoted and rotated to either said first orientation or said second orientation.

8. A multifunction personal computer/mobile phone according to claim 1, wherein said hinge unit permits said display to be pivoted closely adjacent to said left and right keyboards with said back side in said first orientation covering said other of said left and right keyboards and said back side in said second orientation covering said one of said left and right keyboards.

9. A multifunction personal computer/mobile phone comprising a display having a back side and a viewing side, a first keyboard, a second keyboard and a hinge unit joining said first and second keyboards and said display together, wherein said display, said first keyboard and said second keyboard are mounted on said hinge so as to be freely folded and unfolded from a storage configuration and an unfolded spread configuration, said display being disposed between said first and second keyboards so as to be folded in three facing layers, said first keyboard having indications of digits, characters, symbols or the like for personal computer use and said second keyboard having indications of digits, characters, symbols or the like for mobile phone use, said hinge unit having a hinge joint pivotally connecting said first and second keyboards together by so as to be pivotable about a pivot axis, and having a swivel joint supporting said display so as to be both pivotable toward and away from said first and keyboards and rotatable relative thereto between first and second orientations, wherein in each of said orientations said viewing side faces towards a respective one of said first and second keyboards, wherein said first and second orientations face in opposite directions with said display in said first orientation having said viewing side facing toward said one of said first and second keyboards to function in combination therewith as a personal computer and said display in said second orientation having said viewing side facing oppositely toward said other of said first and second keyboards to function in combination therewith as a mobile phone.

10. A multifunction personal computer/mobile phone according to claim 9, wherein said display is pivotable toward and away from each one of said first and second keyboards when in said respective one of said first and second orientations.

11. A multifunction personal computer/mobile phone according to claim 9, wherein said display is pivotable with said back side lying against one of said first and second keyboards and said viewing side facing toward the other of said first and second keyboards.

* * * * *